(12) United States Patent
Yanagi (10) Patent No.: US 6,278,360 B1
(45) Date of Patent: Aug. 21, 2001

(54) VEHICLE COLLISION WARNING SYSTEM

(75) Inventor: Eiji Yanagi, Echi-gun (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/559,109

(22) Filed: Apr. 27, 2000

(30) Foreign Application Priority Data

Apr. 30, 1999 (JP) ................................. 11-123425
Mar. 24, 2000 (JP) ................................. 12-084411

(51) Int. Cl.⁷ .................................................. B60Q 1/00
(52) U.S. Cl. .......................... 340/436; 340/435; 340/438; 340/439; 340/457.1; 340/903; 180/281
(58) Field of Search .................................... 340/436, 438, 340/435, 903, 901, 902, 904, 905, 907, 909, 457.1, 439; 701/117; 180/167, 281, 271, 272, 270

(56) References Cited

U.S. PATENT DOCUMENTS

| | | | |
|---|---|---|---|
| 5,278,764 | * | 1/1994 | Iizuka et al. ......................... 340/903 |
| 5,424,726 | * | 6/1995 | Beymer ................................. 340/902 |
| 5,684,473 | * | 11/1997 | Hibino et al. ........................ 340/903 |
| 5,805,103 | * | 9/1998 | Doi et al. .............................. 342/70 |
| 5,926,114 | * | 7/1999 | Andrews .............................. 340/909 |
| 6,121,896 | * | 9/2000 | Rahman ............................... 340/902 |

FOREIGN PATENT DOCUMENTS 2 262 829   6/1993  (GB).
8-254577   10/1996  (JP).

* cited by examiner

Primary Examiner—Edward Lefkowitz
Assistant Examiner—Davetta Goins
(74) Attorney, Agent, or Firm—Kanesaka & Takeuchi (57) ABSTRACT

A vehicle collision warning system includes a distance measuring device for measuring a distance from a subject vehicle to an obstacle in front of the subject vehicle, a speed detecting device for detecting a speed of the subject vehicle, a control device for receiving signals from the distance measuring device and the speed detecting device and estimating a possibility of collision to the obstacle based on the received signals, and an alerting device electrically connected to the control device. When the control device determines that there is a possibility of collision, the alerting device receives a signal from the control device and emits a first alarm to the subject vehicle and provides a second alarm to a following vehicle without awaiting an action of a driver of the subject vehicle.

6 Claims, 6 Drawing Sheets

VEHICLE COLLISION WARNING SYSTEM

BACKGROUND OF THE INVENTION AND RELATED ART STATEMENT

The present invention relates to a system for judging a possibility of collision to an obstacle in front of its own vehicle, and warning the vehicle of the possible collision.

Conventionally, there have been filed many patent applications, for example, Japanese Patent Publications No. H05-181529 and No. H08-254577, for disclosing a collision avoiding system for avoiding a possible collision between vehicles, and disclosing a collision predictive system for alerting a vehicle driver of a possible collision. Most of these applications disclose systems for judging a possible collision to the obstacle in front of its own vehicle and alerting the vehicle driver to take an action for preventing the collision.

All of the systems automatically actuate engine brakes of its own vehicle and alert the driver of the subject or its own vehicle of an emergency. As it is alerted, the driver may turn a steering wheel and/or rapidly press a brake pedal for collision preventive action. Thereafter, the driver may turn on hazard warning lights to warn a driver of a following vehicle. Accordingly, there is a delay of time for the collision preventive action of the driver of the subject vehicle to the driver of the following vehicle to aware an emergency ahead, so that the driver of the following vehicle sometimes can not take a proper action for the emergency braking and/or the emergency steering. As mentioned, since the emergency warning to the following vehicle is delayed, even if the collision between the subject vehicle and a preceding vehicle, i.e. Obstacle, can be avoided, there is still a possibility of a collision between the subject vehicle and the following vehicle.

The present invention has been made to solve such a problem and an object of the present invention is to provide a vehicle collision warning system which estimates the possibility of vehicle collision and alerts a driver of a following vehicle to take an action for avoiding a collision when the possibility of vehicle collision is high.

SUMMARY OF THE INVENTION

To achieve the above object, a vehicle collision warning system of a first aspect of the present invention comprises distance measuring means for measuring a distance from a subject or its own vehicle to an obstacle or preceding vehicle in front of the subject vehicle by utilizing millimeter wave, laser radiation, or ultrasonic wave, speed detecting means for detecting the speed of the subject vehicle, estimation or control means which receives signals from the distance measuring means and the speed detecting means and estimates the possibility of collision to the obstacle based on the received signals, and alerting means which receives a signal and emits an alarm when the control means determines that there is a possibility of collision, wherein the alerting means emits an alarm to a following vehicle without awaiting the action of a driver of the subject vehicle.

When it is estimated that the possibility of collision of the subject vehicle is high, the following vehicle is automatically alerted, so that the following vehicle can consider the action of the subject vehicle for avoiding a collision. This alerting action can be taken without interrupting the action of the subject vehicle's driver, such as emergency braking and/or emergency steering.

In this present invention, the alarm to the following vehicle is at least one of the following: lighting a stop lamp of the subject vehicle, lighting a hazard lamp of the subject vehicle, alerting through radio communication with the following vehicle, sending a signal to the following vehicle for increasing the tension on a seat belt of the following vehicle, and sending a signal to the following vehicle for automatically braking the following vehicle.

Therefore, a driver of the following vehicle can be securely notified that the subject vehicle is in emergency.

Further, the level of the alarm can be selected in accordance with the degree of the possibility of collision estimated by the control means.

In this case, when it is estimated that the possibility of collision is medium, the alerting means emits a first level alarm including signals for lighting the stop lamp and for alerting through radio communication, and when it is estimated that the possibility of collision is high, the alerting means emits a second level alarm including signals for lighting the stop lamp and the hazard lamp, and for alerting through radio communication.

The driver of the following vehicle can notice the degree of the danger of the subject vehicle.

Furthermore, when the following vehicle receives the alarm from the subject vehicle, an occupant in the following vehicle can be notified by slightly increased tension on a seat belt in case of medium possibility of collision or by significantly increased tension on the seat belt in case of high possibility of collision.

The occupant can be notified by slightly or significantly increased tension on the seat belt, thereby providing secure and early alerting to the occupant as compared to the way using sound or light.

DETAILED DESCRIPTION OF PREFERRED EMBODIMENTS

The present invention will now be described with reference to the accompanying drawings.

Figure 1:
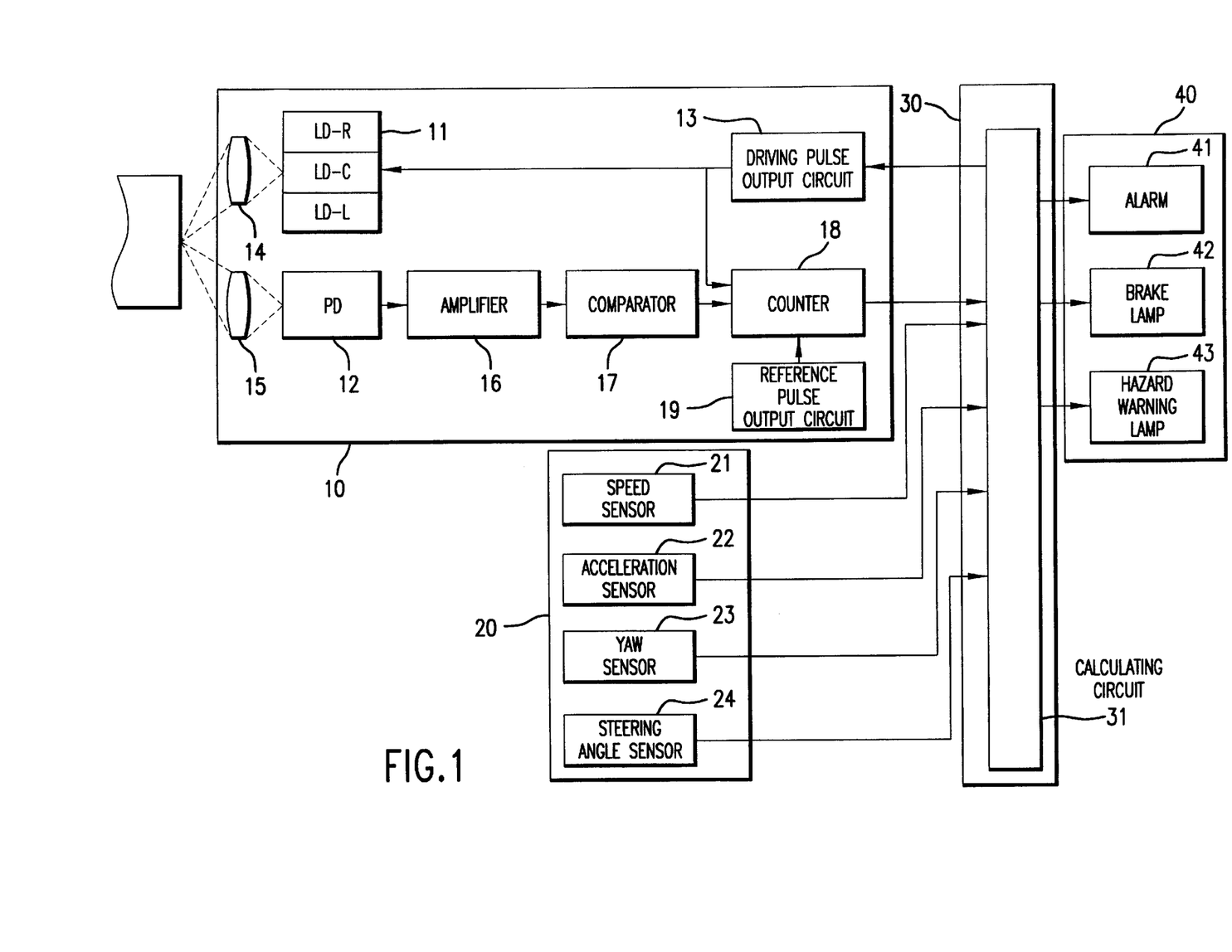
FIG. 1 is a block diagram showing a vehicle collision warning system according to the present invention.

FIG. 1 is a block diagram showing a vehicle collision warning system according to an embodiment of the present invention.

The vehicle collision warning system 1 comprises a distance detecting unit 10, a driving condition detecting unit 20, a control unit 30, and an alerting unit 40. Information inputted from the distance detecting unit 10 and the driving condition detecting unit 20 is transmitted to the control unit 30 where it is processed to estimate the possibility of collision. When it is determined that there is a possibility of collision, a warning is emitted from the alerting unit 40 to a following vehicle.

The alerting unit 40 includes an alarm 41, a stop or brake lamp 42, and a hazard warning lamp 43 disposed on the back of the vehicle. The alarm 41 may be a speaker which emits a warning sound or message for informing a driver of the following vehicle of the possibility of collision. When the control unit 30 estimates that the possibility of collision is medium, a first alarm is emitted, which comprises emission of warning sounds and lighting of the stop lamp 42. When it is estimated that the possibility of collision is high, a second alarm is emitted, which comprises the emission of warning sounds and the lighting of the stop lamp 42 and the hazard warning lamp 43.

Instead of the speaker, by using radio communication means between vehicles or inter-communication means between navigation systems, a speaker inside a vehicle cabin of the following vehicle may be controlled to emit warning sounds, and/or a display of the navigation system may be controlled to indicate "Warning".

The driving condition detecting unit 20 includes a speed sensor 21, an acceleration sensor 22, a yaw sensor 23, and a steering angle sensor 24. Information about speed detected by the speed sensor 21 is transmitted to the control unit 30. The control unit 30 has a calculating circuit 31 where the detected speed is compared with a threshold, e.g. 10 km/h. When the detected speed exceeds the threshold value, the control unit 30 outputs a command to the distance detecting unit 10 for detecting a distance.

The distance detecting unit 10 includes a laser diode (LD) array 11 for detecting the distance between the subject or its own vehicle and an obstacle in front of the subject vehicle. The LD array 11 emits laser beams of a pulse type in a direction from the subject vehicle to the obstacle. A photo-diode (PD) 12 receives beams reflected from the obstacle, so that the relative distance is calculated and obtained from the reaction time.

The relative distance may be measured by utilizing millimeter wave or ultrasonic wave.

The distance detecting unit 10 also includes a driving pulse output circuit 13 which outputs a flush signal to the LD array 11 when the command for detecting the distance is inputted from the control unit 30. The LD array 11 radiates laser beams via light-emitting lens 14 sequentially in accordance with the driving pulse. The LD array 11 is composed of an LD-L, LD-C and LD-R. In the subject vehicle, the LD-L is positioned at the front left, the LD-C is positioned at the front center, and the LD-R is positioned at the front right. Therefore, the LD-L detects a vehicle cutting in front of the subject vehicle from the left-side lane, the LD-C detects a preceding or front vehicle or obstacle, and the LD-R detects a vehicle cutting in front of the subject vehicle from the right-side lane.

The laser beams from the respective LDs collide with the obstacle; reflect from the obstacle; and are received by the PD12 via a light-receiving lens 15. The received beams are amplified by an amplifier 16. The amplified signals include undesired signals reflected, for example, from a near road surface other than an actual obstacle. The signals reflected from the obstacle are selected from the amplified signals through a comparator 17, so that only an obstacle detecting pulse signal is outputted.

The obstacle detecting pulse signal is inputted into a counter 18. Also, inputted into the counter 18 is a clock pulse from a reference pulse output circuit 19. The counter 18 counts a number of clock pulse signals from a rise time of the driving pulse of the LD array 11 to a rise time of the obstacle detecting pulse. That is, a period from a time when the LD array 11 radiates the laser beams to a time when the laser beams are received is counted by the clock pulse and computed. From the computed time period and the velocity of light, the distance information R between the LD and the obstacle can be obtained. The distance information R is transmitted to the control unit 30.

Figure 2:
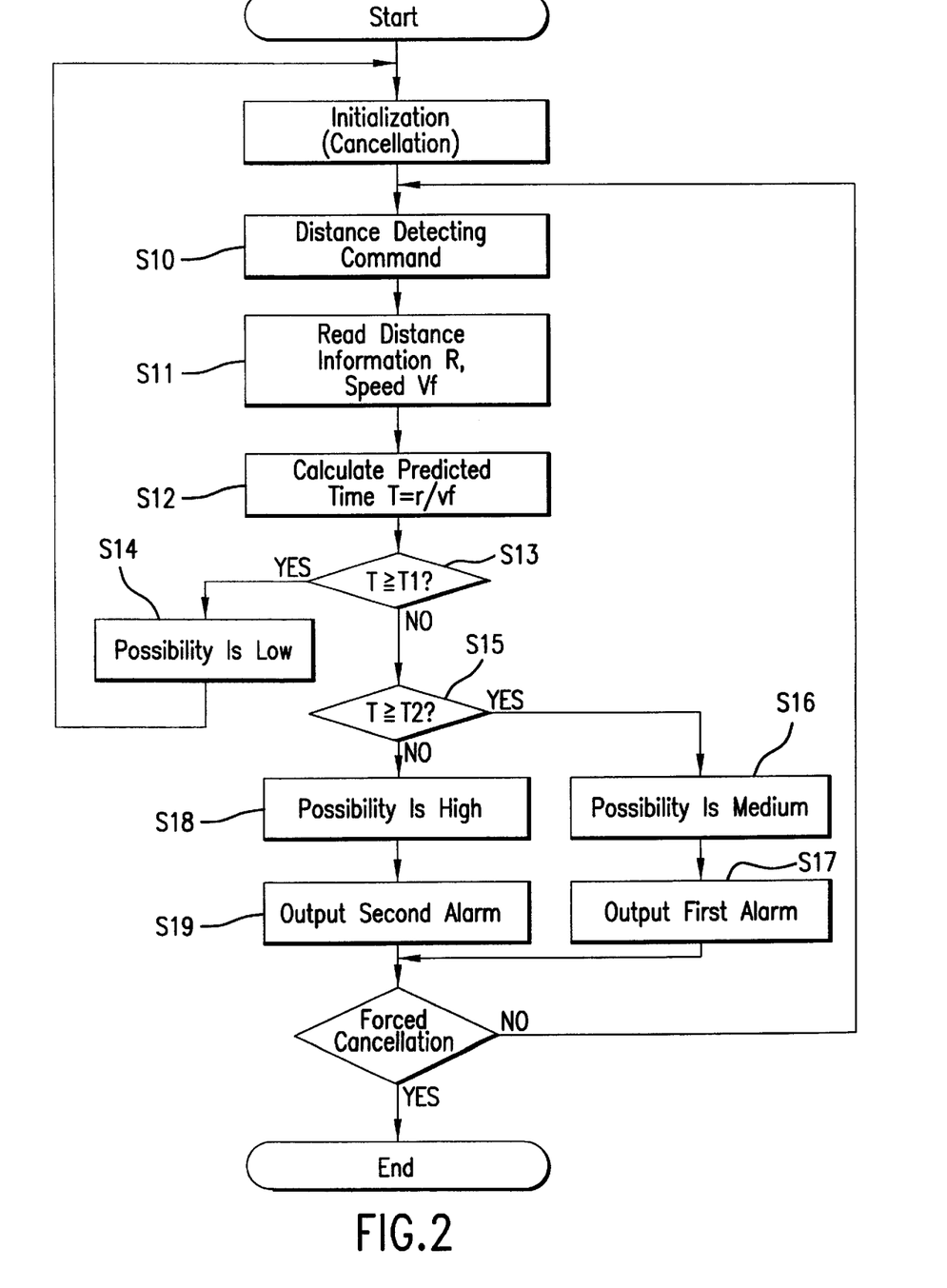
FIG. 2 is a flow chart for estimating the possibility of collision in a control unit.

FIG. 2 is a flow chart showing steps for estimating the possibility of collision in the control unit.

First, at S10, the distance detecting command is sent to the distance detecting unit. In accordance with this command, the distance information R between the subject vehicle and the obstacle detected by the distance detecting unit, and the speed $V_f$ of the subject vehicle detected by the speed sensor of the driving condition detecting unit are read at S11.

Estimation of the possibility of collision with the obstacle is made according to a predicted colliding time obtained by the speed of the subject vehicle and the relative distance between the obstacle and the subject vehicle. That is, from the speed of the subject vehicle $V_f$ and the relative distance R between the obstacle (preceding vehicle) and the subject vehicle, a predicted colliding time $T=R/V_f$ is obtained. When the obtained predicted colliding time T is longer than a predetermined time $T_1$, the driver may avoid the possible collision without taking special action, such as emergency braking and emergency steering. In this case, it is estimated that the possibility of collision is low. When the time T is longer than a predetermined time, i.e. $T_2$ ($<T_1$), somewhat emergency operation is required for avoiding the possible collision. In this case, it is estimated that the possibility of collision is medium. When the time T is shorter than the predetermined time $T_2$, rapid emergency operation is required because there is little time before the collision. In this case, it is estimated that the possibility of collision is high. $T_1$, $T_2$ are determined according to a car model of the vehicle mounted with this warning system.

Therefore, at S12, the predicted colliding time $T=R/V_f$ is obtained from the speed $V_f$ of the subject vehicle and the relative distance R between the obstacle (preceding vehicle) and the subject vehicle. At S13, the predicted colliding time T is compared to the predetermined time $T_1$. When the time T is longer than the time $T_1$, the process proceeds to S14 where it is estimated that the possibility of collision is low. When the time T is shorter than the time $T_1$ at S13, the process proceeds to S15 where the time T is compared to the predetermined time $T_2$ wherein $T_1>T_2$. When the time T is longer than the time $T_2$, the process proceeds to S16 where it is estimated that the possibility of collision is medium. Then, the process proceeds to S17 where the first alarm is emitted. When the time T is shorter than the time $T_2$ in S15, the process proceeds to S18 where it is estimated that the possibility of collision is high. Then, the process proceeds to S19 where the second alarm is emitted.

The alarm is continuously emitted until the predicted colliding time T becomes longer than the time $T_1$ by increasing the relative distance R or lowering the vehicle speed $V_f$. As the time T becomes longer than the time $T_1$, the alarm is cancelled.

When it is determined, based on the information inputted from the yaw sensor 23 or the steering angle sensor 24, that the collision can be avoided enough by the steering operation, it is estimated that the possibility of collision is low.

Figure 3:
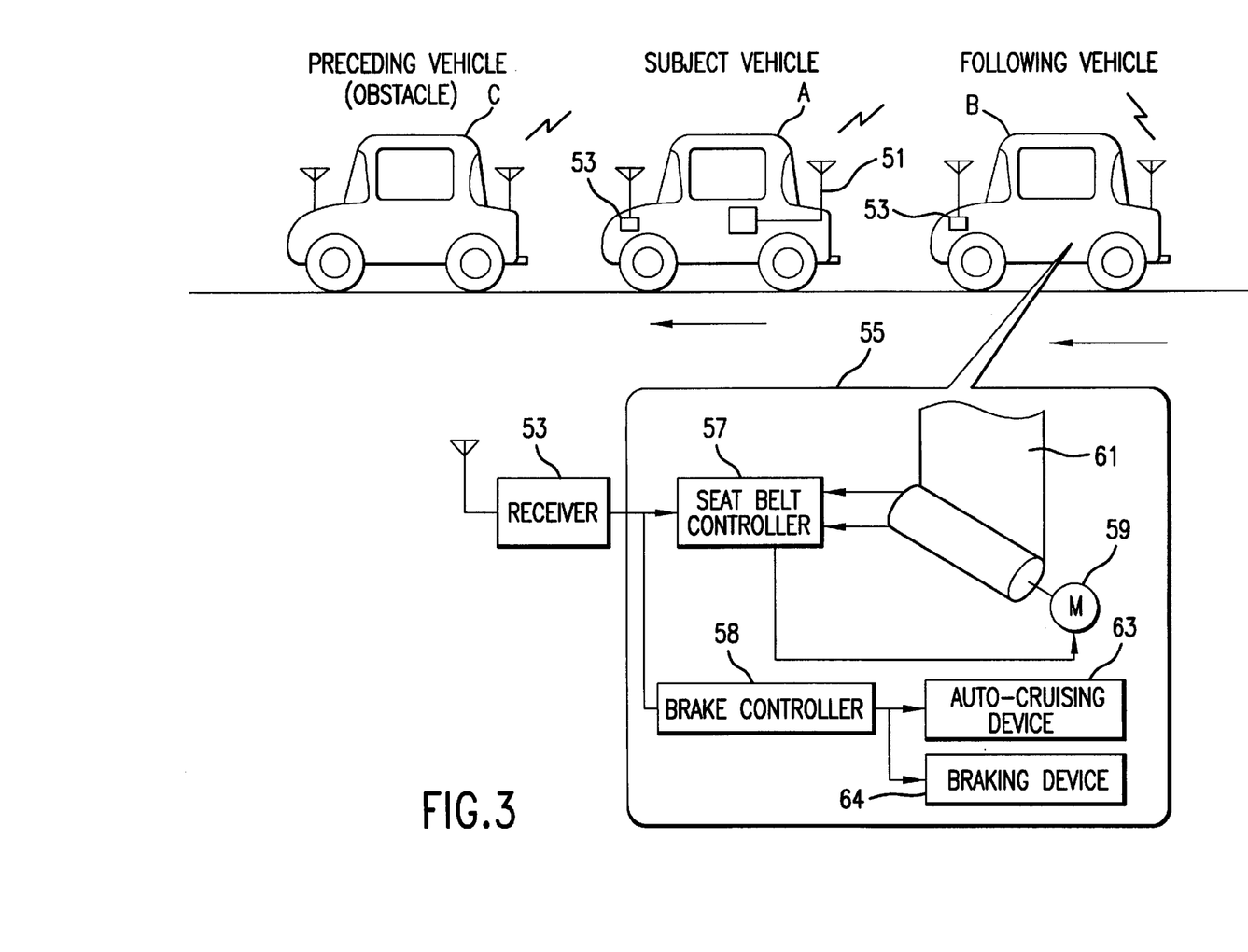
FIG. 3 is a view schematically showing a vehicle collision warning system according to another embodiment of the present invention.

FIG. 3 is a view schematically showing a vehicle collision warning system according to another embodiment of the present invention.

The vehicle collision warning system has an alerting unit which comprises a transmitter 51 of a radio type for emitting a warning signal to the following vehicle and a receiver 53 for receiving the emitted warning signal. The signal received by the receiver 53 is transmitted to an automatic controller 55 which comprises a seat belt controller 57 and a brake controller 58. The seat belt controller 57 controls the torque of a motor 59 of a seat belt retractor. The brake controller 58 automatically outputs a command for braking.

In a running vehicle A, the possibility of collision is estimated by the control unit, and a command for emitting a first alarm or a second alarm is outputted from the transmitter 51 in accordance with the degree of the possibility of collision. The outputted command is received by the receiver 53 via an antenna of a following vehicle B and is then transmitted to the automatic controller 55. The automatic controller 55 regulates the torque of the motor 59 of the seat belt retractor in two stage. It should be noted that the torque may be regulated in one stage or three stages, or may be regulated linearly without stage.

When the first alarm is outputted according to the estimation of medium possibility of collision by the vehicle A and is received by the following vehicle B, the seat belt controller 57 of the control unit 55 of the vehicle B outputs a command for imparting a first torque to the motor 57. When the second alarm is outputted according to the estimation of high possibility of collision and is received by the following vehicle B, the seat belt controller 57 outputs a command for imparting a second torque to the motor 59 or the brake controller 58 receives a command for automatically braking the vehicle.

The first torque is set at such a value that a somewhat large tension is applied to a seat belt 61 so as to impart somewhat restraint force to an occupant, thereby notifying the occupant that the vehicle is approaching to an emergency situation. The second torque is set at such a value that a large tension is applied to the seat belt 61 so as to impart restraint force to the occupant, thereby notifying the occupant that the vehicle is in an emergency situation.

Figure 4:
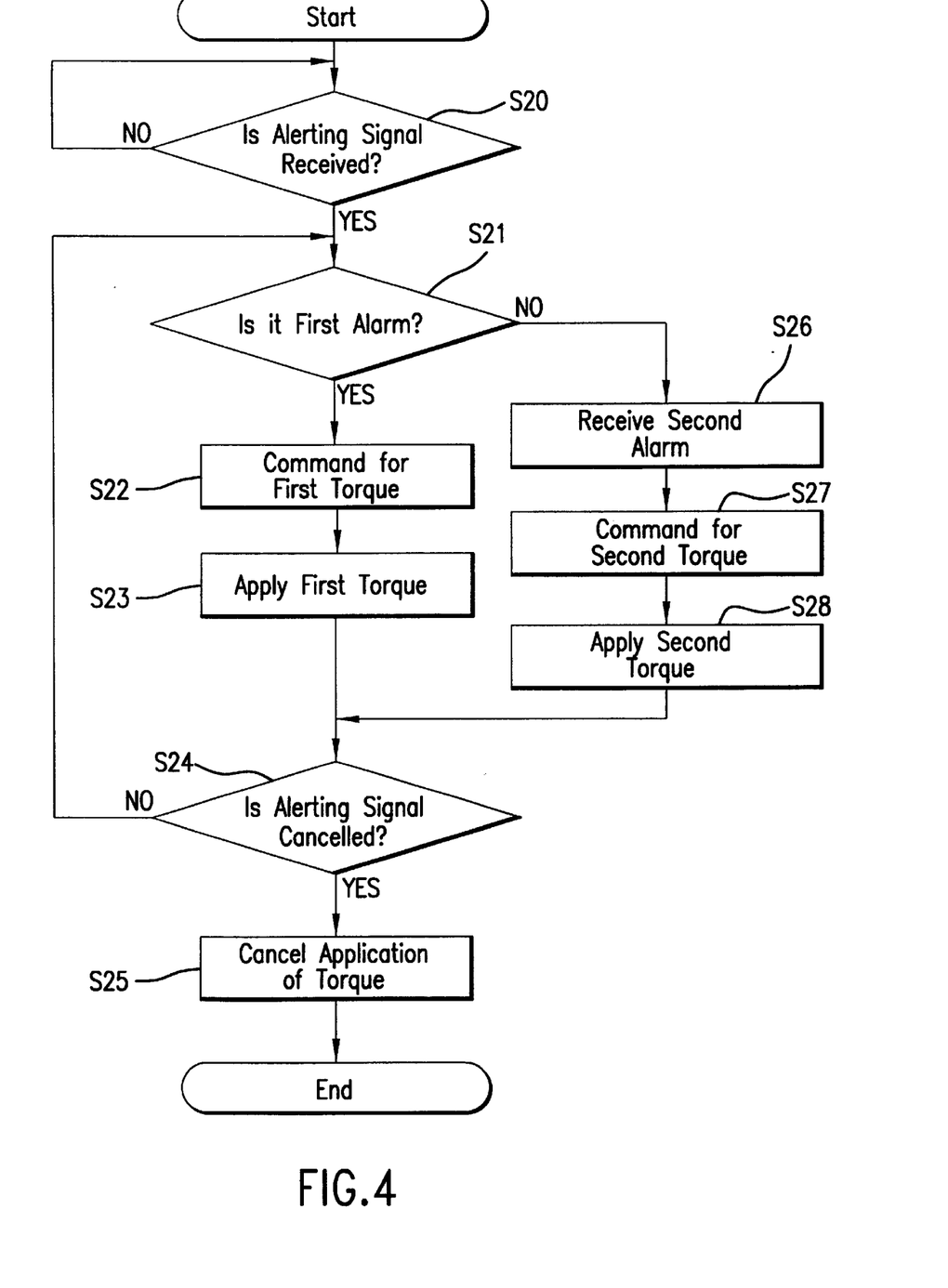
FIG. 4 is a flow chart showing an example of steps for processing of alerting signals in a control unit of the vehicle collision warning system of FIG. 3.

FIG. 4 is a flow chart showing an example of steps for processing alerting signals in the control unit of the vehicle collision warning system of FIG. 3.

First, at S20, it is judged whether any alerting signal is received by the receiver. As the alerting signal is received by the receiver, the process proceeds to S21 where the control unit judges whether the alerting signal is the first alarm. In case of the first alarm, the process proceeds to S22 where the control unit commands the seat belt controller 57 of the automatic controller 55 to develop the first torque. According to this command, the seat belt controller 57 develops the first torque to slightly increase the seat belt tension for alerting the occupant. This torque is continuously developed until the alarm is cancelled at S24.

When it is judged that the alerting signal is not the first alarm at S21, the process proceeds to S26 where the control unit determines that the alerting signal is the second alarm. In this case, at S27, the control unit commands the seat belt controller 57 of the automatic controller 55 to develop the second torque. According to this command, the seat belt controller 57 develops the second torque to significantly increase the seat belt tension for alerting the occupant. This torque is continuously developed until the alarm is cancelled at S24.

Figure 5:
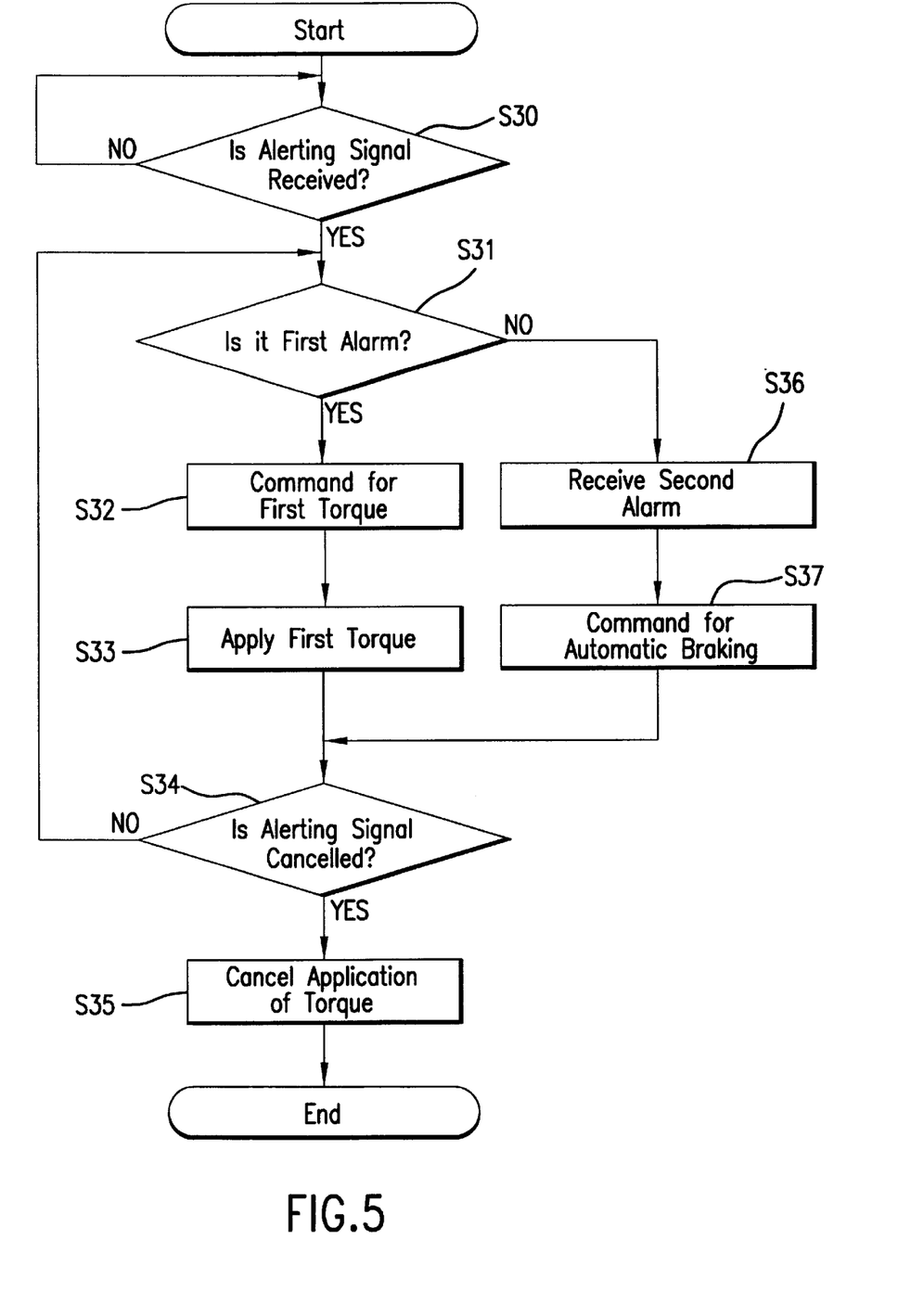
FIG. 5 is a flow chart showing another example of steps for processing of alerting signals in the control unit of the vehicle collision warning system of FIG. 3.

FIG. 5 is a flow chart showing another example of steps for processing alerting signals in the control unit of the vehicle collision warning system of FIG. 3.

First, at S30, it is judged whether any alerting signal is received by the receiver. As the alerting signal is received by the receiver, the process proceeds to S31 where the control unit judges whether the alerting signal is the first alarm. In case of the first alarm, the process proceeds to S32 where the control unit commands the seat belt controller 57 of the automatic controller 55 to develop the first torque. According to this command, the seat belt controller 57 develops the first torque to slightly increase the seat belt tension for alerting the occupant. This torque is continuously developed until the alarm is cancelled at S34.

When it is judged that the alerting signal is not the first alarm at S31, the process proceeds to S36 where it is determined that the alerting signal is the second alarm. In this case, at S37, the control unit commands the brake controller 58 of the automatic controller 55 to output a command for actuating brakes. According to this command, the brake controller 58 actuates brakes to decelerate the vehicle at S38, thereby keeping the distance between the vehicles. This command is continuously outputted until the alarm is cancelled at S34.

Figure 6:
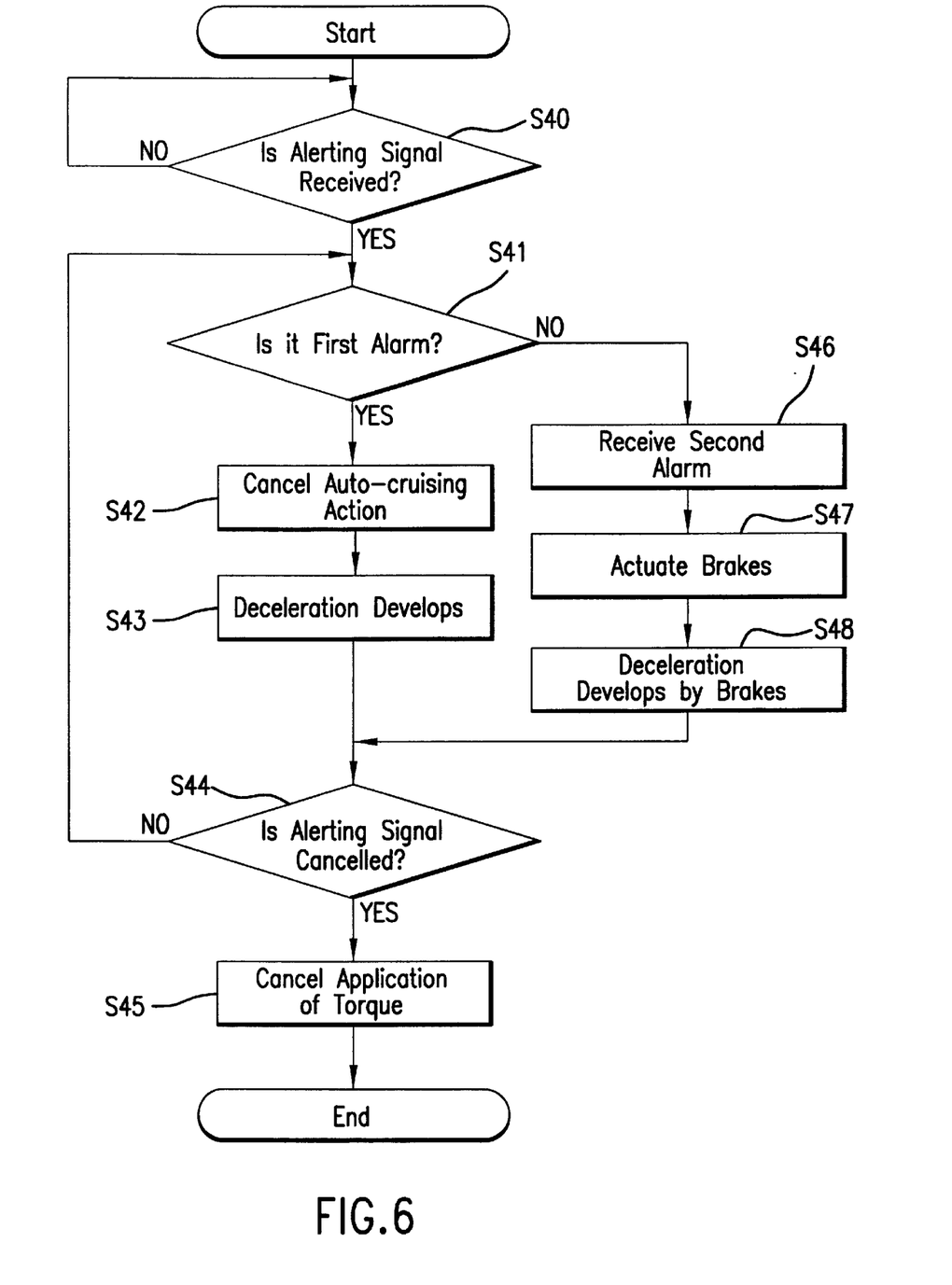
FIG. 6 is a flow chart showing another example of steps for processing of alerting signals in the control unit of the vehicle collision warning system of FIG. 3.

FIG. 6 is a flow chart showing another example of steps for processing alerting signals in the control unit of the vehicle collision warning system of FIG. 3.

In this example, the brake controller 58 of the automatic controller 55 comprises an auto-cruising device 63 and a braking device 64 to provide two-stage braking action. That is, when the following vehicle receives the first alarm during running, the auto-cruising action or acceleration is cancelled by the auto-cruising device 63 and a deceleration G of a first stage is developed on the vehicle. When the following vehicle receives the second alarm, the control unit commands the braking device 64 to perform braking action for automatically braking the vehicle and a larger deceleration G is developed. At this point, the deceleration G developed by the cancellation of the auto-cruising action is smaller than the deceleration G developed by the braking device.

First, at S40, it is judged whether any alerting signal is received by the receiver. As the alerting signal is received by the receiver, the process proceeds to S41 where the control unit judges whether the alerting signal is the first alarm. In case of the first alarm, the process proceeds to S42 where the control unit commands the brake controller 58 of the automatic controller 55 to cancel setting of the auto-cruising action. According to this command, the vehicle is decelerated to keep the distance from the preceding vehicle. This cancellation of the auto-cruising continues until the alarm is cancelled at S44. Alternatively, as the distance between the vehicles becomes long enough for safety, the auto-cruising action may be set again.

When it is judged that the alerting signal is not the first alarm at S41, the process proceeds to S46 where it is determined that the alerting signal is the second alarm. In this case, at S47, the control unit commands the brake controller 58 of the automatic controller 55 to output a command for actuating the brakes. According to this command, the braking device 64 actuates the brakes to decelerate the vehicle at S48, thereby rapidly decelerating the vehicle. This command is continuously outputted until the alarm is cancelled at S44.

As an alternative example, in the flow chart shown in FIG. 4, after the first torque is developed at S23, the auto-cruising action is cancelled to develop a deceleration G. In addition, after the second torque is developed at S28, the braking action is commanded to actuate the brakes.

Though the possibility of collision is estimated from the predicted collision time in the above embodiments, the possibility of collision may be estimated by comparing the distance from the preceding vehicle and the predicted distance to be required for stopping the vehicle that can be estimated from the acceleration detected by the acceleration sensor 22.

As apparent from the above description, the present invention can provide a vehicle collision warning system which estimates the possibility of collision of a subject or its own vehicle and, when the possibility is high, the system informs a following vehicle that the subject vehicle starts to take action for avoiding an accident. Therefore, the possibility of collision with a preceding vehicle is predicted and the following vehicle is informed early that the preceding vehicle starts to take an action for avoiding the accident, so that in the following vehicle, the driving condition of the preceding vehicle can be considered in driving its own car for avoiding a collision.

While the invention has been explained with reference to the specific embodiments of the invention, the explanation is illustrative and the invention is limited only by the appended claims.

What is claimed is:

1. A vehicle collision warning system, comprising:

distance measuring means for measuring a distance from a subject vehicle to an obstacle in front of the subject vehicle;

speed detecting means for detecting a speed of the subject vehicle;

control means electrically connected to the distance measuring means and the speed detecting means for receiving signals from the distance measuring means and the speed detecting means, said control means estimating a possibility of collision to the obstacle based on the received signals; and alerting means electrically connected to the control means, said alerting means, when the control means determines that there is a possibility of collision, receiving a signal from the control means, emitting a first alarm to the subject vehicle and providing a second alarm to a following vehicle without awaiting an action of a driver of the subject vehicle, said second alarm being a signal sending to the following vehicle for increasing tension of a seat belt of the following vehicle.

2. A vehicle collision warning system according to claim 1, wherein said distance measuring means utilizes millimeter wave, laser radiation, or ultrasonic wave.

3. A vehicle collision warning system according to claim 1, wherein said second alarm to the following vehicle additionally includes at least one means selected from the group consisting of lighting a stop lamp of the subject vehicle, lighting a hazard lamp of the subject vehicle, alerting through radio communication to the following vehicle, and sending a signal to the following vehicle for automatically braking the following vehicle.

4. A vehicle collision warning system according to claim 3, wherein said second alarm has levels of warnings selected in accordance with a degree of possibility of collision estimated by said control means.

5. A vehicle collision warning system according to claim 4, wherein when it is estimated that a possibility of collision is medium, said alerting means emits a first level alarm including signals for lighting the stop lamp and alerting through the radio communication; and when it is estimated that the possibility of collision is high, said alerting means emits a second level alarm including signals for lighting the stop lamp and the hazard lamp, and alerting through the radio communication.

6. A vehicle collision warning system according to claim 1, wherein said second alarm includes a first level alarm for providing a first tension to the seat belt of the following vehicle to notify that the following vehicle is approaching to an emergency situation, and a second level alarm for providing a second tension greater than the first tension to the seat belt of the following vehicle to notify that the following vehicle is in the emergency situation.

* * * * *